United States Patent [19]

Nadas

[11] 3,878,924

[45] Apr. 22, 1975

[54] AUTOMATIC RESETTING DEVICE FOR BRAKES

[75] Inventor: Gyula Nadas, Eching, Germany

[73] Assignee: Knorr-Bremse GmbH, Munich, Germany

[22] Filed: July 12, 1974

[21] Appl. No.: 488,257

[30] Foreign Application Priority Data

July 23, 1973 Germany............................ 2337420

[52] U.S. Cl............................. 188/203; 188/196 D
[51] Int. Cl............................................ F16d 65/66
[58] Field of Search ....... 188/71.9, 196 D, 202, 203

[56] References Cited
UNITED STATES PATENTS

| | | | |
|---|---|---|---|
| 3,194,358 | 7/1965 | Brandt............................ | 188/196 D |
| 3,482,662 | 12/1969 | Bruhn et al..................... | 188/196 D |
| 3,744,596 | 7/1973 | Sander............................. | 188/203 |

Primary Examiner—Duane A. Reger
Attorney, Agent, or Firm—Edmund M. Jaskiewicz

[57] ABSTRACT

A brake cylinder has a reciprocating piston therein from which extends a non-rotatable sleeve surrounding a coaxial nonrotatable axially displaceable threaded shaft upon which is threaded a coupling nut. A pair of rotary couplings are provided on opposed sides of the coupling nut with the sleeve and the rotary couplings are actuable by axial displacement of the coupling nut. An axially displaceable control sleeve is resiliently urged in the braking direction against the coupling nut and is capable of limited axial displacement. The spring acting against the control sleeve has one end upon a fixed stop and a second stop is provided on the coupling nut which is spaced rearwardly of the first stop when the brake resetting device is in the inoperative position.

9 Claims, 3 Drawing Figures

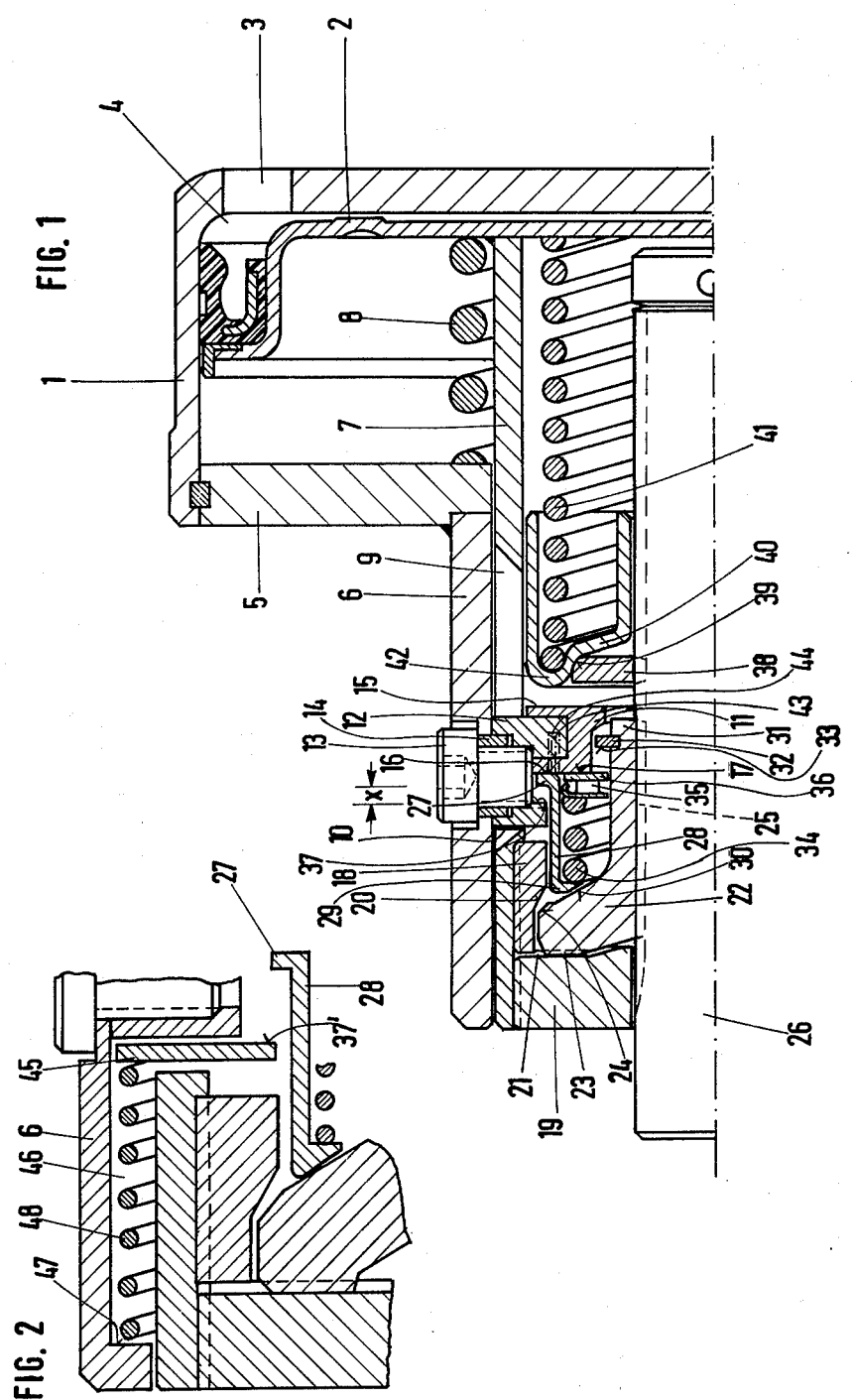

AUTOMATIC RESETTING DEVICE FOR BRAKES

The present invention relates to a brake on railway vehicles and the like, more particularly, to an automatic resetting device for such brakes.

Various forms of automatic brake linkage adjusting devices have been provided for the brakes on railway vehicles. One such a device comprises an adjustable axially displaceable non-rotatable threaded shaft which transmits braking force and is disposed coaxially within a non-rotatable sleeve connected to a source of a braking force. A coupling nut is threaded on the spindle and two rotary clutches positioned on opposite sides of the coupling nut are adapted to be actuated by axial displacement of the coupling nut with respect to the spindle. A control sleeve is urged by a spring through a stop clutch against the coupling nut and the control sleeve is limited in movement by stops. Such an automatic resetting device is disclosed in German Offenlegungsschrift No. 1,955,460. This resetting device is exclusively double-acting in that it is capable of adjusting both excessively large and excessively small braking strokes to the correct value. In the braking direction the coupling nut is urged against the control sleeve by a bearing and a spring.

In the braking direction, the control sleeve is positioned with a predetermined spacing with respect to the coupling nut by utilizing a further pivot bearing and is displaceable against the force of a second spring in the braking direction. For the proper functioning of this resetting device it is essential that the second spring be sufficiently powerful to be able to thread the coupling nut back against the force of the first spring. It is thus apparent that after an advance of the sleeve through this spacing during the braking operation the brake piston must operate against the considerable force of the second spring during additional movement in the braking stroke. This is disadvantageous since a considerable proportion of the brake applying force is lost. Thus, in addition to the expense and construction difficulties involving two springs adapted to each other and also two pivot bearings this known resetting device involves a considerable loss of braking force.

The German Specification No. 1,169,985 discloses a single-acting brake linkage adjusting device which is capable of adjusting relatively large but not relatively small brake application strokes. The control sleeve is displaceable between stops only within a predetermined range corresponding to the desired stroke path and the stops are spring-biased in the braking direction. Such an adjusting device is again disadvantageous since the construction thereof requires a second nut having control components and as a result the adjusting device is costly and requires a relatively large number of components. In addition, such an adjusting device cannot be actuated so as to be double-acting.

It is particularly desirable in the case of railway vehicle brakes to provide a brake linkage adjusting device which is either single-acting or double acting. For the actuation of disk brakes it is advantageous to employ a single-acting adjusting device but to use a double-acting adjusting device in the actuation of brake shoes. Known adjusting devices are constructed differently depending on whether they are intended to be a single-acting or double-acting. In addition, the manufacture and storing of replacement components is made more difficult and expensive because of these fundamentally different constructions of the adjusting devices.

It is therefore the principal object of the present invention to provide a novel and improved automatic resetting device for the braking of railway vehicles which can be both single-acting and double-acting.

It is another object of the present invention to provide an automatic resetting device for brakes of the type as described herein which is simple in construction, requires a minimum of components, occupies a relatively small volume when assembled on a vehicle and which can be readily manufactured without requiring a large inventory of parts.

It is a further object of the present invention to provide such an automatic resetting device for brakes wherein the brake piston acts only against a spring which is relatively weak and thus a high percentage of the brake application force is utilized.

According to one aspect of the present invention, an automatic resetting device for brakes particularly for railway vehicles may comprise a non-rotatable sleeve which is axially displaceable in the braking direction in response to a braking force and an axially displaceable non-rotatable threaded shaft is coaxially disposed within the sleeve. A coupling nut is threaded upon the shaft so as to be capable of rotary and axial movement thereon. The sleeve is provided with means disposed on both sides of the coupling nut to define a first rotary coupling with one side of the coupling nut and a second rotary coupling with the other side of the coupling nut. The rotary couplings are actuable by axial displacement of the coupling nut with respect to the shaft. An axially displaceable control sleeve is resiliently urged in the braking direction against the coupling nut by spring means. Stop means are provided which are engageable by the control sleeve to limit the axial displacement of the control sleeve within a predetermined range. The end of the spring means away from the control sleeve abuts a first stop which is fixed with respect to the control sleeve. A second stop is provided on the coupling nut so as to be spaced rearwardly of the first stop when the brake resetting device is in the inoperative position.

If it should be desired to operate the adjusting device of the present invention so as to be only single-acting the control sleeve is then constructed so as to be non-rotatable but axially displaceable.

Other objects and advantages of the present invention will be apparent upon reference to the accompanying description when taken in conjunction with the following drawings, which are exemplary, wherein;

FIG. 1 is a longitudinal sectional view of an automatic resetting device for brake linkage combined with a brake cylinder according to the present invention;

FIG. 2 is a portion of a sectional view according to FIG. 1 but showing in greater detail a modification.

Proceeding next to the drawings wherein like reference symbols indicate the same parts throughout the various views a specific embodiment and modification will be described in detail.

Figure 3:
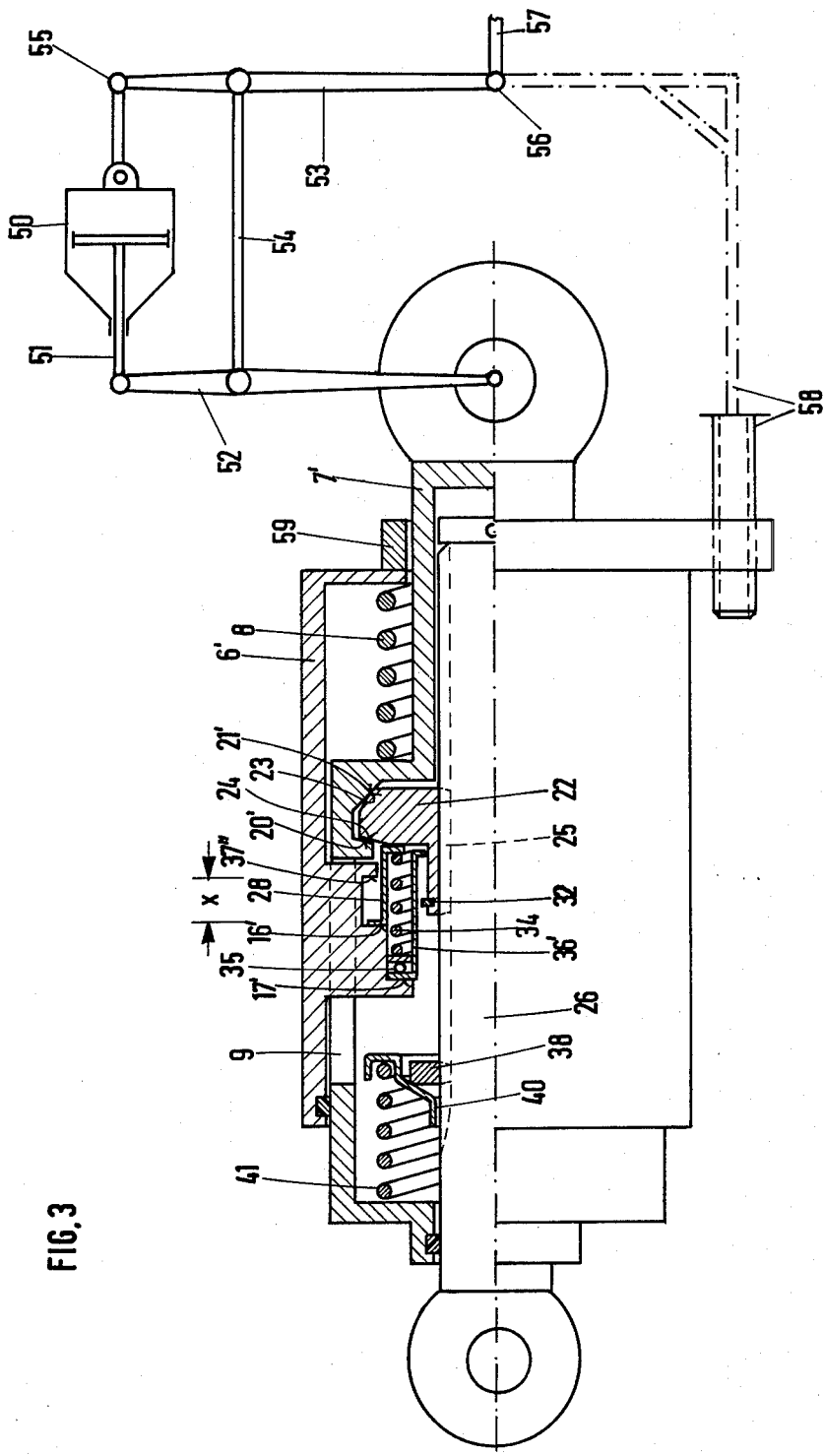
FIG. 3 is an elevational view with the upper portion of the brake cylinder and adjusting device being shown in longitudinal section showing the assembly of the resetting device of the present invention with a brake linkage.

With particular reference to FIG. 1, a brake cylinder housing 1 has a brake piston 2 sealed therein and axially displaceable therein. A line connection 3 in the cylinder housing 1 permits the introduction of a pressure medium into a cylinder chamber 4 which is located between the bottom of the cylinder housing 1 and the piston 2.

The front side of the brake cylinder housing 1 is sealed by a plate 5 from which extends a tubular projection 6 within which is displaceably positioned a sleeve 7 one end of which is attached to the piston 2. A linkage return spring 8 is positioned between the cover plate 5 and the piston 2.

In the portion of the sleeve 7 which is axially displaceable within the tubular portion 6 there is formed a slot 9 at one end of which is a forward stop 10. Within the sleeve 7 is an annular stop ring 11 mounted on an intermediate member 12 which extends into the slot 9. The stop ring 11 is mounted so as to be non-rotatable and non-displaceable within the tubular portion 6. A screw 13 fixes the intermediate member 12 to the tubular portion 6 and in order to relieve the threads of the screw 13 of at least a portion of the load sleeves 14 are positioned around the screw 13 over at least a portion of its length.

The radial face of the stop ring 11 facing toward the piston 2 forms a stop 15 and the radial face on the other side of the stop ring 11 forms in its radially outward portion a stop 16 and its radially inner portion a first spring stop 17. Securely threaded into the front end of the sleeve 11 are two coupling rings 18 and 19 which have coupling faces 20 and 21 respectively facing toward each other.

Positioned between the coupling rings 18 and 19 is a coupling nut 22 having a coupling surface 24 facing toward the coupling surface 20 of coupling ring 18 and a coupling surface 23 facing the coupling surface 21 of coupling ring 19. The coupling surfaces 20 and 24 thus define a rotary clutch or coupling 20, 24 in the form of a cone clutch and the coupling surfaces 21 and 23 which extend radially are provided with teeth extending axially to form a rotary clutch 21, 23 between the coupling nut 22 and the sleeve 7.

The coupling nut 22 is threaded upon a non-selfretarding thread 25 upon an adjusting spindle or shaft 26 whose end facing the brake piston 2 is pivotally connected in a known manner to a brake linkage which is not shown in the drawing. A control sleeve 28 surrounds the coupling nut 22 and has a radial external flange 27 which is engageable with the stop 16. The outer end of control sleeve 28 is provided with a radial internal flange 29 which is engageable against the coupling nut 22 to provide a stop clutch 30 postioned radially inwardly of the coupling surface 24.

The coupling nut 22 is provided with a tubular extension 31 extending in the direction toward the brake piston 2 and which projects as far as the zone of the stop ring 11. A flange ring 32 is fixed on the outer surface of the tubular extension 31 in this vicinity to provide a second spring stop 33. Between the control sleeve 28 and the coupling nut extension 31 is a biased spring 34 the front end of which rests against the control sleeve flange 29 and the rear end of which bears by means of a thrust bearing 35 upon an annular member 36 which is loosely mounted upon the coupling nut extension 31 within the control sleeve 28. The radially outer portion of the annular member 36 bears against the first spring stop 17 and its radially inner portion bears against the second spring stop 33. The stop 16 is in the forward or braking direction which is on the side remote from the brake cylinder 2 and is disposed opposite and in spaced relation with respect to a stop 37 projecting inwardly from the intermediate member 12. The stop 37 is so positioned that the flange 27 of the control sleeve 28 and thus also the control sleeve 28 itself is axially displaceable between the stops 16 and 37 through a range indicated by the distance $x$.

An adjusting nut 38 is threaded onto the shaft 26 in the area between the stop ring 11 and the piston 2 so as to engage at 39 against a guide ring 40 which is mounted for axial displacement around the shaft 26 and within the sleeve 7. The stop 39 prevents rotation of the guide ring 40. A compression spring 41 is tensioned between the piston 2 and the guide ring 40 to load the ring 40 in the braking direction against the adjusting nut 30. The guide ring 40 is maintained in a non-rotatable relationship with respect to the brake cylinder 2 by known structure which is not shown in the drawings but which may comprise radially projecting bosses extending to a longitudinal groove formed in the sleeve 7 or soley by means of friction forces exerted by the compression spring 41. The guide ring 40 is also provided with a bulging or projecting portion 42 positioned radially outwardly of the adjusting nut 38 so that the bulge extends axially to a slight degree beyond the adjusting nut 38 and thus engages the pressure stop 15 while permitting a small axial clearance between the adjusting nut 38 and the stop 15.

For a single-acting embodiment of this adjusting device the control sleeve 28 is provided around its periphery with a plurality of axially extending pins which are slidably received within recesses 44 passing through the flange portion 16 of stop ring 11 and into the intermediate member 12.

The present embodiment of the adjusting device as described above is intended for a double-acting operation and would function in the following manner:

In the inoperative condition with the brakes released there is no pressure in the chamber 4 and the spring 8 presses the piston 2 into its end position away from the cover plate 4. This end position is determined by the abutment of the front stop 10 in slot 9 with the forward surface of the intermediate member 12. The flange 27 of control sleeve 28 bears against stop 16 or may be only negligibly spaced therefrom so that the entire stroke $x$ is located between the flange 27 and the stop 37. The spring 34 exerts a force in one direction through thrust bearing 35 and annular member 36 against the first spring stop 17 on fixed stop ring 11 and exerts a force in the other direction through flange 29 and stop clutch 30 against the coupling nut 22 so as to urge the nut 22 with its coupling face 23 against the coupling face 21 of the coupling ring 19. Since the return spring 8 is considerably stronger than the spring 34 the force exerted by the spring 34 is merely expended to the stop ring 11 and to the tubular projection 6. The rotary clutch 21, 23 is closed and the rotary clutch 20, 24 is open. The second spring stop 33 is spaced from the annular member 36 by a distance which is approximately equal to the travel or stroke $x$. The bulge 42 on guide ring 40 is spaced from the stop 15 on stop ring 11 a distance corresponding to the stroke $x$ which may be increased by a travel distance corresponding to the resilient brake linkage deformation or taking up of slack under maximum brake actuation conditions. The compression spring 41 exerts sufficient force against guide ring 40 through stop 39 against the adjusting nut 38 to prevent rotation of this adjusting nut. The compression spring 41 thus exerts a force through the adjusting nut 38 and the shaft 26 to increase the closing force of rotary clutch 21, 23 on the front face of the coupling nut 22.

As may be seen in FIG. 1, the adjusting spindle or shaft 26 is threaded to the maximum possible extent in the direction toward the brake cylinder housing 1. In practical operation, the shaft 26 will generally be in a position wherein it is threaded a short distance in the opposite direction. The brake linkage which is not shown in the drawing retains the spindle 26 so as to be non-rotatable about its longitudinal axis.

In order to actuate the brake, a pressure medium is introduced into the chamber 4 and the brake cylinder piston 2 is correspondingly displaced against the force of return spring 8 in the braking direction toward the cover plate 5. The sleeve 7 with its coupling rings 18 and 19 is thus displaced in the braking direction together with the coupling nut 22 which is acted upon by the spring 34 whereby the rotary clutch 21, 23 and also the stop clutch 30 remain closed. The spring 34 will also cause the control sleeve 28 to move in the braking direction so that the flange 27 is disengaged from the stop 16 and approaches the stop 37. Correspondingly, the second spring stop 33 approaches the annular member 36. Since the coupling nut 22 is held against rotation by the rotary clutch 21, 23, the adjusting shaft 26 is also displaced by means of its thread 25 upon which the coupling nut 22 is threaded to displace the brake linkage into the braking or application direction.

The compression spring 41 will assist the movement of the adjusting shaft 26 by exerting a force through the guide ring 40, the stop 39 and the adjusting nut 38 which is retained against rotation.

If the brake application stroke has been correctly set, the brake will become engaged just when the shaft 26 has advanced to such an extent that the flange 27 of the control sleeve 28 just engages stop 37 and the second spring stop 33 of the flange ring 32 just engages the annular member 36.

However, should the application stroke of the brake linkage be too short such as might occur when the brake lining has just been replaced, the brake will become engaged when there is still a predetermined space between the flange 27 and stop 37 or between the second spring stop 33 and the annular member 36. Upon further advance of the brake cylinder piston 2 together with the sleeve 7 and the coupling rings 18 and 19, the springs 34 and 41 will no longer be able to carry along the shaft 26. On the contrary, the shaft 26 will remain stationary because of the force acting in the opposite direction and exerted by the applied brake through the brake linkage. The coupling ring 19 is thus separated somewhat from the coupling nut 22 whereby the rotary clutch 21, 23 is disengaged and the spring 34 is able through the flange 29 and the stop clutch 30 to cause the coupling nut 22 to follow this forward movement of the sleeve 7 by rotation of the nut 22 upon the shaft 26.

The spring 34 and the control sleeve 28 will rotate with the coupling nut 22. This forward threading of the coupling nut 22 will continue until the control sleeve flange 27 engages the stop 37 and the second spring stop 33 engages the annular member 36. The coupling nut 22 is then threaded upon the shaft 26 through a distance which is equal to that which the application stroke of the brake was short. As a result, the application stroke is now adjusted to its correct value.

During subsequent stages of this braking operation the brake cylinder 2 will be further moved in the braking direction together with the sleeve 7 but the coupling nut 22 will be unable to follow this movement because of stopping of the spring 34 through the flange 29 and the engagement of the flange 27 of the control sleeve 28 against the stop 37 on the one hand and the abutment of the second spring stop 33 on the annular member 36 on the other hand.

The rotary clutch 21, 23 is thus disengaged and the rotary clutch 22, 24 immediately engages or closes. During further movement of the brake piston 2 in the braking direction the sleeve 7 through the coupling ring 18 and the closed rotary clutch 20, 24 will carry or be drivingly connected with the coupling nut 22 which is prevented from rotating. At the same time, by means of the thread 25 the shaft 26 which is non-rotatable because of its connection to the brake linkage is carried along and produces a vigorous application of the brake while accompanied tensioning of the brake linkage. The second spring stop 33 will carry the annular member 36 which will be disengaged from the first spring stop 17 and the spring 34 will be compressed since it has been somewhat released during the preceding braking stroke. Because the control sleeve 28 has its flange 27 abutting on stop 37 the control sleeve will not be able to follow this movement and the stop clutch 30 will be released.

When the brake cylinder piston 2 is subjected to the maximum pressure and thus the brake is actuated to its highest degree, the projecting portion 42 on the guide ring 40 should just engage the pressure stop 15 on the stop ring 11. If this abutment has already occurred, the guide ring 40 will be retained by the stop ring 11 with respect to the sleeve 7 the adjusting nut 38 will abut the pressure stop 15 and will be threaded along the shaft 26 during the remainder of the braking stroke (as previously described) up to the maximum force exertion on the brake by the nut 38 rotating on the shaft 26 in the direction toward the piston 2. The stop 39 is thus slightly released by the amount of the axial projection of the bulge 42 beyond the adjusting nut 38 in the braking direction.

In order to release the brake the pressure within the cylinder chamber 4 is reduced. During this discharge of the braking force previously exerted by the pressure medium the brake linkage will absorb any play therein and will thus displace the shaft 26 in the direction toward the brake cylinder housing 1. By means of the coupling nut 22 and the engaged rotary clutch 20, 24 and also the coupling ring 18 the sleeve 7 will be carried in this released direction along with the brake piston 2. The return spring 8 and the spring 34 are thus partially tensioned whereas the compression spring 41 is compressed by adjusting nut 38 which is retained against rotation because of the abutment of the stop 39 on guide ring 40 and the nut 38 is thus carried along with the shaft 26. During this return or release movement as soon as the annular member 36 moving back together with the coupling nut 22 engages the first spring stop 17, the braking force and thus any play in the brake linkage are cancelled if the release stroke of the brake has been correctly set and the brake will then abut without any force. At the same instance, as the coupling nut 22 accompanied by closure of the stop clutch 30 will abut the flange 29 of control sleeve 28.

During further reduction of pressure in the chamber 4 only the return spring 8 will press the cylinder 2 and the sleeve back toward the release position illustrated in FIG. 1. The brake linkage will no longer exert any force on the adjusting shaft 26 but this shaft will be loaded opposite to the release movement by the compression spring 41 acting through the guide ring 40, stop 39 and adjusting nut 38. The spring 34 also loads the coupling nut 22 opposite to the return movement by means of the thrust bearing 35 and annular member 36 against the stop ring 11 and through the flange 29 and stop clutch 30. During further release movement of the sleeve 7 the rotary clutch 20, 24 will be disengaged and immediately thereafter the rotary clutch 21, 23 will be engaged. The coupling nut 22 is now retained against rotation by the engaged rotary clutch 21, 23 because of the force of the spring 34 and will be urged back because of the force of the return spring 8 exerted through sleeve 7 and coupling ring 19 to thus carry back the shaft 26 through threads 25.

This return movement of the adjusting shaft 26 produces on one hand through the brake linkage a release of the brake by the amount of the release clearance thereof whereby the brake will come back into its completely released condition and on the other hand will produce a further compression of the spring 41 through the action of the adjusting nut 38 and the guide ring 40. During this return movement, the coupling nut 22 will carry the control sleeve 28 along by means of the stop clutch 30 so that the flange 27 is separated from stop 37 and passes at least substantially into abutment at the stop 16. The second stop spring 33 is meanwhile disengaged from the annular member 36. Upon abutment of the front limit 10 of longitudinal slot 9 on the forward surface of intermediate member 12 the completely released condition of the device is again attained as shown in FIG. 1.

If the braking operation has brought about a wear of the braking surfaces so that an excessively large return stroke is set (considering that an excessively small release stroke has already been corrected on applying the brakes) then the brake linkage will be already unstressed when the annular member 36 has not yet abutted spring stop 12 and coupling nut 22 has not yet abutted control sleeve 28 at stop clutch 30 during return movement. If no further force is exerted by the brake linkage on the spindle 7, the spindle 7 will then remain stationary under the force of the compression spring 41 acting in the opposite direction during further return of the piston 2 and sleeve 7 together with the coupling rings 18 and 19. The rotary clutch 20, 24 is meanwhile being released to a slight degree. Immediately upon release of rotary clutch 20, 24, the coupling nut 22 will begin to thread itself back on the spindle which is stationary because of the force acting on the coupling nut 22 through the thrust bearing 35, annular member 36 and the second spring stop 33 arrested at the otherside by control sleeve 28 having flange 29 against the stop 37 of intermediate member 12.

Thus, coupling nut 22 is threaded back on the adjusting shaft 26 to correspond to the return travel of the brake cylinder piston 2 and sleeve 7 until the annular member 36 abuts first spring stop 17. The spring 34 is then arrested against the stop ring 11 and is no longer able to exert any return force on the coupling nut 22. Simultaneously, the coupling nut 22 will abut control sleeve 28 through stop clutch 30 and the spring 34 will thus oppose any further return movement of the coupling nut 22. During further return displacement of the piston 2 with sleeve 7 under the action of the return spring 8, the coupling nut 22 will remain stationary for a short time and the rotary clutch 20, 24 will open and the rotary clutch 21, 23 will close. Subsequent release operation will occur as described above.

It is to be noted that the spring 34 will always bias the coupling nut 22 in the braking direction during the release movement of the brake linkage and will load the coupling nut in the opposite direction during braking. It is thus the function of the spring 34 to so load the coupling nut 22 that in the event of a faulty release stroke the coupling nut 22 will be threaded on the adjusting shaft 26 in the correct direction in each particular instance. Since the spring 34 does not oppose any other spring, contrary to known brake linkage adjusting devices, the strength of the spring 34 may be so selected to assure reliable overcoming of the resistance to threading of the coupling nut 22 on the adjusting shaft 26. Thus, again contrary to known adjusting devices, this spring may be relatively weak in force and as a result will reduce to a correspondingly low degree the braking force which the brake piston 2 might exert.

As a modification of the embodiment as described above, it is possible to omit the compression spring 41 together with the guide ring 40, the adjusting nut 38 and the stop 39 if it is certain that the brake linkage will remain stationary after its tensioning forces have been removed during the release procedure under its own frictional resistance or under a suitably installed separate movement brake. Further, the force of the return spring 8 may be employed to engage the rotary clutch 21, 23 in the released condition. For this purpose it is only necessary to insure that in the released condition of the brake linkage adjusting device the front stop 10 does not abut on the intermediate member 12 as described above but is disposed opposite this front surface at a short distance. However, in this case the flange 27 of control sleeve 28 must abut on stop 16. The force of the return spring 8 will then be transmitted through the piston 2, sleeve 7, coupling ring 19, rotary clutch 21,23 which is closed under this force, coupling nut 22, stop clutch 30, control sleeve 28 with its flange 27 abutting stop 16, and also the intermediate member 12 and the tubular projection 6 back to the cover plate 5.

The adjusting device as described above may also be employed to be only single-acting wherein only excessively large release strokes of the brake linkage are corrected. Under such operation it is only necessary to mount the control sleeve 28 so as to be axially displaceable with respect to the tubular projection 6 but to be non-rotatable.

One construction by means of which this mounting of the control sleeve 28 may be achieved is illustrated in dot-dash lines of FIG. 1 wherein the axial projections 43 on control sleeve 28 are slidably received in individual recesses 44 formed in the stop ring 11 and/or the intermediate member 12. The function of this single-acting embodiment will thus correspond to the above described double-acting embodiment except that upon initiation of the braking operation after disengagement of the flange 27 from the stop 16 and prior to engagement of the flange 27 at the stop 37 a movement resistance will already be transmitted from the brake linkage to the shaft 26. The coupling nut 22 will be held against rotation by the stop clutch 30, the control sleeve 28 and the projections 43 guided in the recesses 44. The coupling nut can then not be threaded on the adjusting shaft 26 in the braking direction under the force of the spring 34.

In this situation, the coupling nut 22 will thus remain stationary together with the adjusting shaft 26 and during further travel of the piston 2 the rotary clutch 21, 23 will open, the coupling nut 22 is prevented from being threaded along the shaft 26 by the interengagement of the projections 43 and the recesses 44, the rotary clutch 20, 24 therefore immediately closes and subsequently through the action of sleeve 7, coupling ring 18 and rotary clutch 20, 24 the coupling nut 22 will be carried along with the adjusting shaft 26. With the above exceptions, all further functions of the adjusting device will correspond to the double-acting embodiment as described above.

If a large stroke of the brake linkage is required to apply the brake, the construction of FIG. 2 may be used in order to keep the overall installed length of the brake adjusting device as short as possible. In the modification of FIG. 2, the stop 37 is not stationary as an element secured to the tubular projection 6 but a stop 37' is provided at a separate stop ring 45. The projection 6 is thus formed in its forward portion with an annular recess 46 within which is disposed a spring 48 whose front end bears against end face 47 of the recess 46 and whose other end engages stop ring 45. Stop ring 45 is mounted loosely between the tubular projection 6 and control sleeve 28. As a result of this construction, during the tensioning stroke of the brake linkage when the control sleeve 28 is already bearing with its flange 27 on stop 37' and by means of the second spring stop 33 is being recompressed from the rear, the tensioning stroke does not need to be absorbed soley due to the spring stroke of spring 34.

As soon as the spring 34 has obtained a predetermined degree of tension or is pressed on during a further portion of the tensioning stroke the stop ring 45 will be displaced against the force of the spring 48 with respect to the tubular projection 6 in the braking direction and accordingly a supplemental tensioning stroke path is made possible. The release process occurs correspondingly but in the opposite direction.

In FIG. 3 there is illustrated a modification of the brake linkage adjusting device which is not suitable for free installation in a brake linkage in combination with a brake force motor. However, its function and construction is substantially similar to that of the embodiment discloses in FIG. 1.

In FIG. 3 a simple brake cylinder 50 has a piston 51 extending therefrom which is pivotally connected to a brake lever 52 of a conventional H-brake linkage comprising a second brake lever 53 and also a pullrod 54 which is pivotally connected therebetween. The second end of the brake lever 52 is pivotally connected to the sleeve 7' which partially surrounds the adjusting spindle 26 and is provided with coupling surfaces 20' and 21' located opposite each other. The second brake lever 53 is pivoted on one end to a fixed point 55 and on its other end to a pivotal connection 56 on a brake linkage element 57 extending to the brake. Pivotally connected to the point 56 is a lever 58 which is connected for adjustment with a ring 59 displaceable mounted on the sleeve 7'. The ring 59 is coupled with a tubular projection 6' which surrounds the sleeve 7'. Tensioned between the projection 6' and the sleeve 7' is the linkage return spring 8. The coupling faces 20' and 21' are on both sides or enclose the adjusting nut 22 which is provided with corresponding coupling faces 23 and 24 and which is threaded upon the adjusting spindle 26 by means of the same non-selfretarding thread 25.

Positioned between the coupling nut 22 and a stop 16' on the projection 6' is the control sleeve 28 which is loaded in the braking direction at coupling nut 22 by the spring 34 and which after traveling along the brake application stroke path $x$ is arrested by a stop 37'' on the projection 6'. The other end of the spring 34 engages by means of the thrust bearing 35 and the annular member 36' at the first spring stop 17' of the projection 6'. The annular member 36' is constructed with a Z-shaped cross section in order to shorten the overall length of the coupling.

The coupling nut 22, similar to the embodiment of FIG. 1, is provided with a flange ring 32 which is engageable with the annular member 36'. The stops 16', 17' and 37'' are arranged at a section of the tubular projection 36' and projecting through the slot 9 formed in the sleeve 7'. The adjusting nut 38 is threaded upon the screwthread 25 of the spindle 26 and bears against guide 40 and compression spring 41 the other end of which rests upon a portion of sleeve 7'.

The function of the brake linkage adjusting device as disclosed in FIG. 3 corresponds completely to the function of the device of FIG. 1, except that it is pointed out that according to FIG. 3 the adjusting device is subjected to stressing in tension whereas in FIG. 1 it is subjected to stressing in compression. It is therefore unnecessary to provide a complete detailed description of the functioning of the device of FIG. 3.

Thus it is apparent that the present invention has disclosed an improved brake linkage adjusting device which is capable of either single-acting or double-acting operation. The adjusting device may be further modified to reduce its overall installation length in those applications where particularly large braking strokes are required.

It will be understood that this invention is susceptible to modification in order to adapt it to different usages and conditions, and accordingly, it is desired to comprehend such modifications within this invention as may fall within the scope of the appended claims.

What is claimed is:

1. In an automatic resetting device for brakes particularly for railway vehicles the combination of non-rotatable sleeve axially displaceable in the braking direction in response to a braking force, an axially displaceable non-rotatable threaded shaft coaxially disposed within said sleeve, a coupling nut threaded upon said shaft and capable of rotary and axial movement thereon, means on said sleeve for defining a first rotary coupling with one side of said coupling nut and a second rotary coupling with the other side of said coupling nut, said rotary couplings being actuatable by axial displacement of said coupling nut with respect to said shaft, an axially displaceable control sleeve and spring means resiliently urging said control sleeve in the braking direction against said coupling nut, stop means engageable by said control sleeve to limit the axial displacement thereof within a predetermined range, the end of said spring means away from said control sleeve engaging a first stop fixed with respect to said control sleeve, and a second stop on said coupling nut spaced rearwardly of said first stop when the brake resetting device is in the inoperative position.

2. In an automatic resetting device as claimed in claim 1 wherein said second stop is spaced from said first stop a distance approximately equal to the range of displacement of said control sleeve.

3. In an automatic resetting device as claimed in claim 1 wherein said coupling nut comprises an extension in the direction away from said first rotary coupling, said second stop being mounted on said extension, an annular ring loosely mounted on said extension, a thrust bearing at said end of said spring means and bearing against said annular ring, said annular ring being engageable with said second stop.

4. In an automatic resetting device as claimed in claim 3 wherein said first stop comprises a flange on a stop ring surrounding said second stop, said second stop comprising a flange ring on said coupling nut extension.

5. In an automatic resetting device as claimed in claim 4 wherein one of said stop means for said control sleeve comprises an annular face of said stop ring, said one stop means and said first stop being located in the same radial plane.

6. In an automatic resetting device as claimed in claim 1 wherein the other of said stop means for said control sleeve is displaceable in the braking direction against the force of a second spring means.

7. In an automatic resetting device as claimed in claim 1 wherein said control sleeve is non-rotatable.

8. In an automatic resetting device as claimed in claim 4 and a plurality of axial extensions arranged at the periphery of said control sleeve, said stop ring having recesses therein slidably receiving said control sleeve projections to retain said control sleeve against rotation.

9. In an automatic resetting device as claimed in claim 1 and a non-rotatable guide ring mounted for axial displacement upon said threaded shaft and within said sleeve, a compression spring having one end acting upon said sleeve opposite to the braking direction and the other end acting against said guide ring, a fixed stop limiting the displacement of said guide ring in the braking direction, an adjusting nut threaded on said shaft axially between said fixed stop and said guide ring and engageable with said guide ring, a portion of said guide ring projecting in the braking direction axially beyond said adjusting nut so that axial clearance is provided between said fixed stop and said adjusting nut when said guide ring contacts the fixed stop.

* * * * *